Nov. 16, 1948. S. SMITH 2,453,943
TRUCK LOADING MEANS
Filed March 18, 1946 3 Sheets-Sheet 2
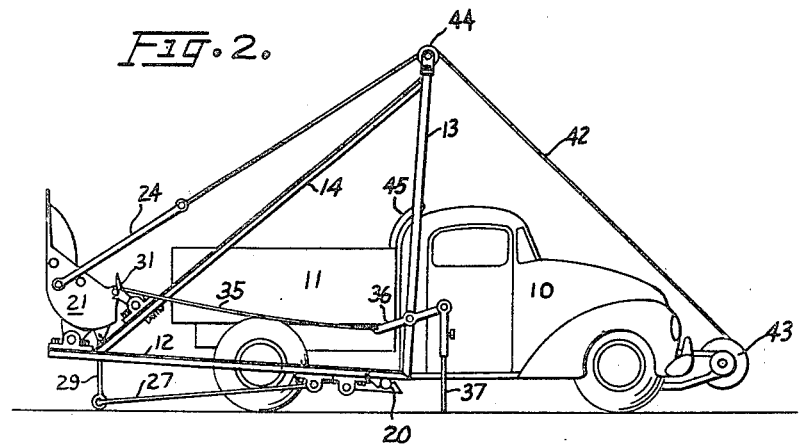
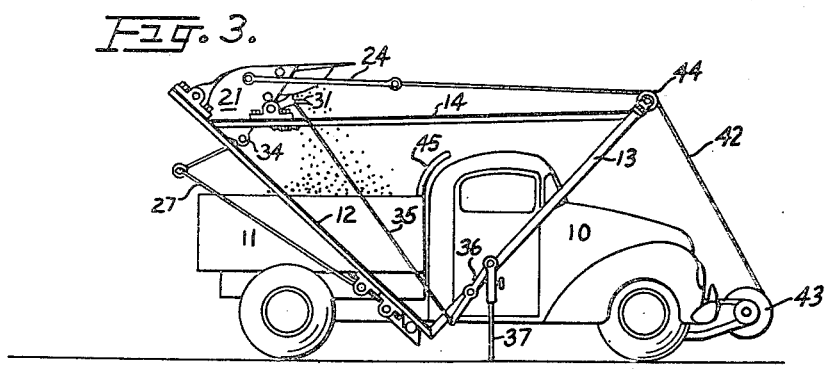
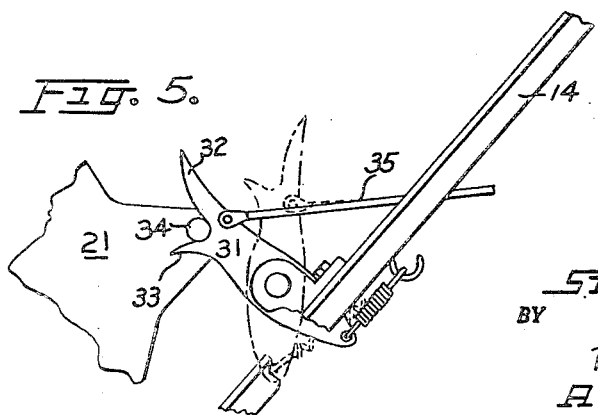
INVENTOR.
STANLEY SMITH
BY
ATTORNEY Nov. 16, 1948.   S. SMITH   2,453,943
TRUCK LOADING MEANS
Filed March 18, 1946   3 Sheets—Sheet 3
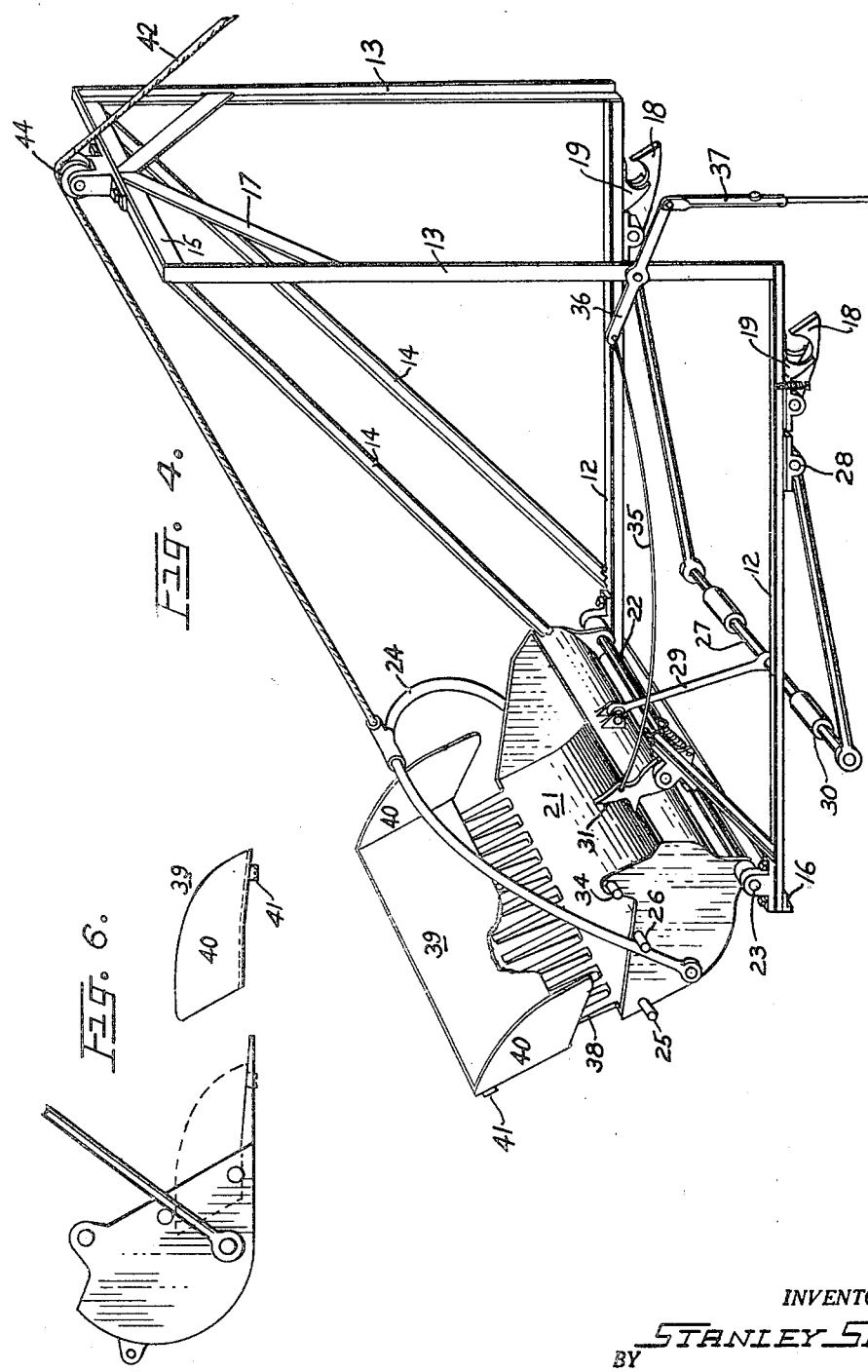
INVENTOR.
STANLEY SMITH
BY
ATTORNEY Patented Nov. 16, 1948

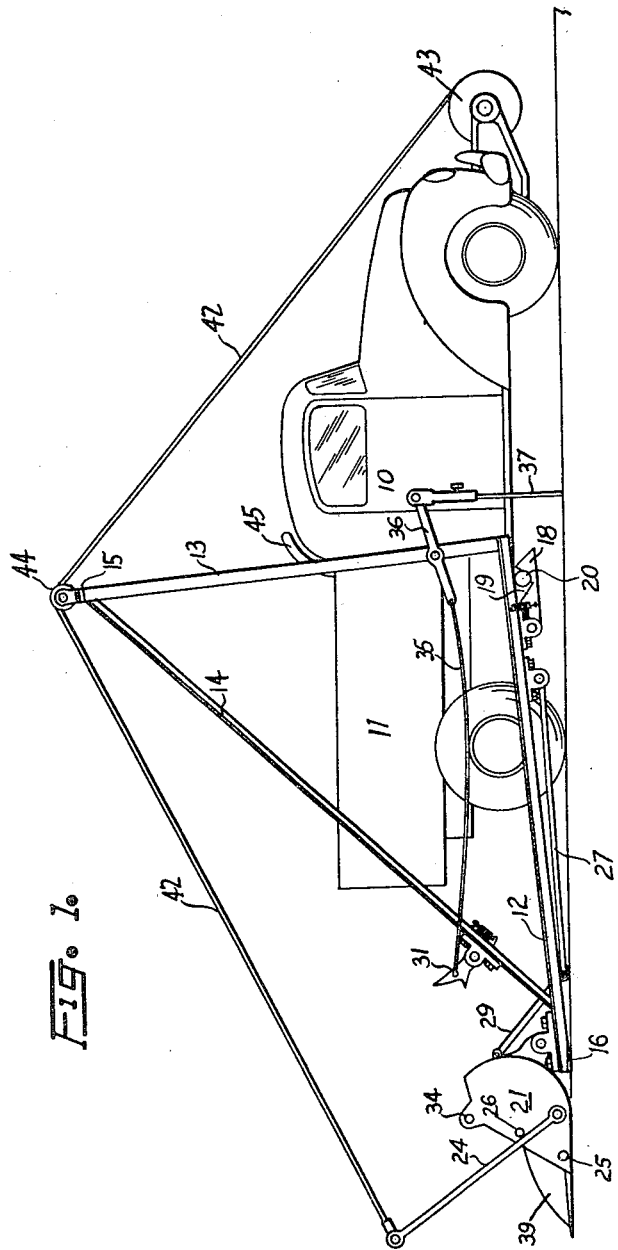

2,453,943

UNITED STATES PATENT OFFICE 2,453,943

TRUCK LOADING MEANS

Stanley Smith, Bend, Oreg.

Application March 18, 1946, Serial No. 655,260

8 Claims. (Cl. 214—78)

This invention relates in general to means mounted on a truck whereby load material to be carried by the truck, such, for example, as rock, earth, gravel, sand, coal, sawdust, and the like, can be scooped from the ground and loaded into the truck.

In particular, the present invention relates to self-loader attachments for trucks such as that described in my U. S. Letters Patent No. 2,387,687, issued under date of October 23, 1945, entitled Truck self-loader attachment, to which reference is made.

The principal object of this invention is to provide an improved and relatively simple loading device, suitable for mounting on any ordinary truck, by means of which the operator of the truck can easily load the truck.

Another object of the invention is to provide a truck loading device which will include a scoop and improved and simple means for positioning the scoop and for discharging the contents from the same, so arranged that the loading of the material into the truck can be controlled by the operator of the truck without difficulty and without any particular effort.

A further object of the invention is to provide a control for a loading scoop which, when desired, will operate automatically and thereby cause the scoop to discharge its load at a predetermined location on the truck.

An additional object is to provide a simple, practical scoop which will be capable of being readily converted either into a power-operated loading fork or power-operated shovel, depending upon the type of material to be engaged and picked up by the scoop and loaded into the truck.

Other objects and advantages of my present invention will be apparent from the following brief description in which reference is made to the accompanying drawings.

In the drawings:

Fig. 1 is a side elevation of a truck with my truck loading means mounted thereon, the loading means, including the scoop, being shown in the position taken at the start of the loading operation;

Fig. 2 is a similar side elevation, drawn to smaller scale, showing the scoop in raised position during the early stage of the lifting of the scoop load;

Fig. 3 is a similar side elevation showing the scoop lifted into discharging position and discharging its load into the truck;

Fig. 4 is an enlarged view, in perspective, of the scoop and frame of the loader, with associated parts, detached from the truck, and also showing the cover removed from the prongs of the scoop;

Fig. 5 is an enlarged detail view of the latch control for the scoop; and Fig. 6 is a fragmentary side elevation of the scoop illustrating the manner of attaching the cover over the prongs of the scoop.

Referring first to Figs. 1 and 4, my loading means is shown mounted on a conventional-type truck 10 having the usual load-carrying portion or bin 11. The loading means includes a triangular frame comprising a main bottom rail 12, an upright 13, and a diagonal frame member 14, on each side, connected by cross members 15 and 16 at the top and bottom respectively, the frame members being welded or otherwise rigidly secured together and having suitable bracing members, such as 17, so as to form a strong but simple frame. The frame is wider than the overall width of the truck and the forward end of the frame is pivotally mounted on the truck. Preferably the frame is detachably as well as pivotally mounted on the truck and for this purpose an extensible rod on the truck and cooperating engaging means on the frame, such as that described in my U. S. Letters Patent No. 2,387,687, could satisfactorily be employed. In the drawings I show a slightly modified detachable mounting comprising a pair of pivoted latches 18 and cooperating members 19 on the bottom of the frame and a rod 20 secured to the truck chassis and extending transversely with respect to the chassis.

A scoop, indicated in general by the reference character 21, is pivotally carried on the rear end of the frame. Thus in the construction shown in Fig. 4, the scoop 21 is rotatably supported on a bar 22, the ends of the bar 22 being in turn supported in brackets 23 secured to the frame. The scoop 21 has a U-shaped handle 24, the ends of which are pivotally attached to the sides of the scoop respectively. A pair of pins 25 and 26, mounted on each of the sides of the scoop, limit the movement of handle and scoop with respect to each other.

An auxiliary U-shaped scoop-positioning frame 27 is hinged to the bottom rails 12 of the main frame at 28. A link 29 has its bottom end pivotally mounted on the auxiliary frame 27 and the top end hinged to the back of the scoop, as shown in Fig. 4. A pair of ground rollers 30 are mounted on the auxiliary frame 27, the purpose of which will be explained later.

A spring-controlled latch 31 (see also Fig. 5), is mounted on one or the other of the diagonal main frame members 14 (for example, the near side member 14 as shown in Figs. 1 and 4). The end of this latch 31 has a curved notch formed by a long finger 32 and a short finger 33 (Fig. 5), and the notch is adapted to engage a pin 34 in the side of the scoop 21. A rope or small cable 35 connects the latch 31 to one end of a lever arm 36 pivoted on an upright 13 of the main frame on the same side as the latch 31 is located. To the other end of lever arm 36 a ground-engaging rod 37 is hinged, which rod may be made in the adjustable form shown in the drawings.

The bottom of the scoop 21 preferably carries a series of prongs or teeth 38 to enable the scoop to function as a fork when the scoop is to be used for picking up coarse material, such as wood blocks or chunks, without picking up dirt with such material, since the dirt will drop through the teeth. However, when fine material, such as sand or fine gravel, is to be loaded, I provide a sheet steel cover 39 having a bottom and sides 40 (see Figs. 4 and 6). The bottom of the cover 39 has U-shaped guides 41 which slip over the teeth 38 of the scoop when the cover is set in place, and the sides 40 of the cover slide part way inside the sides of the scoop.

The truck 10 is provided with a suitable power-driven drum 43 which is shown mounted at the front of the truck. When the main frame of the loading means is set in place on the truck—thus by having the latches 18 and cooperating members 19 engage the corresponding ends of the rod 20, as previously explained—a cable 42, having one end wound on the drum 43, is placed over a pulley 44, mounted on the top cross piece 15, and its free end is connected to the handle 24 of the scoop 21. Sufficient slack is allowed in the cable 42 to permit the rear end of the main frame of the loading means, and with it the scoop 21, to rest on the ground. The contact of the auxiliary frame 27 with the ground will cause the link 29 (Fig. 1) to tilt the scoop downwardly until the prongs and bottom of the scoop contact the ground. The entire loading device will now be in the position illustrated in Fig. 1 and the device is ready for the loading of the truck.

The operation of the loading means is as follows: With the loading means and scoop in the position shown in Fig. 1, the truck is backed until the scoop encounters the material to be loaded. Let it be assumed that the material to be loaded consists of fine gravel. For such material the cover 39 is set in place over the teeth of the scoop, as indicated in Fig. 1. The scoop is pushed into the material by the backing of the truck until the scoop is filled. Then power is applied to the drum 43 to wind the cable 42. The pull on the cable 42 causes the scoop handle 24, and with it the scoop 21 to be rocked towards the truck. But this backward rocking of the scoop forces the scoop, and with it the rear end of the main frame, to be lifted from the ground due to the action of the link 29 connecting the scoop with the auxiliary frame 27. The backward rocking of the scoop will continue only until the latch 31 is engaged by the pin 34 in the side of the scoop. The entire loading means will now be in the position illustrated in Fig. 2. The bottom end of the rod 37 is resting on the ground.

As the pull on cable 42 is continued the entire main frame will now be rocked on the rod 20 causing the scoop load to be lifted above the loading bin 11 of the truck into some such position as that illustrated in Fig. 3. However, this rocking of the main frame, when the bottom end of the rod 37 is resting on the ground, will result in movement of the lever arm 36, which in turn will cause a pull to be exerted on cable 35, connected with latch 31, until the latch 31 is pulled from engagement with the pin 34 in the side of the scoop. When this occurs the scoop rocks back still further causing the scoop to discharge its load onto the truck, as illustrated in Fig. 3. The operator now shuts off the power to winding drum 43 and permits the cable 42 to unwind from the drum, thus allowing the loading means to drop back to the ground preparatory to obtaining another scoop load.

As the main frame and with it the scoop 21 and auxiliary frame 27 drop back to the ground it will be evident from Figs. 1, 2 and 3, that the auxiliary frame 27 will reach the ground first, and, through the medium of the link 29, will rock the scoop 21 down into the loading position of Fig. 1 as the main frame continues to be lowered to the ground. The rollers 30 on the auxiliary frame 27 enable the rear end of the auxiliary frame to move over the ground surface without difficulty.

With the entire loading means now having returned to the position shown in Fig. 1, the loading action is repeated. Thus the truck is again moved backward slightly to cause the scoop to be filled with the material and then power is applied to the winding drum 43 producing the resulting tilting and lifting and final discharging of the scoop load as previously described.

It will be apparent from Figs. 2 and 3 that the time at which the discharging of the scoop onto the truck takes place—in other words, the time at which the latch 31 is pulled out of engagement with the pin 34 on the scoop by the action of the lever arm 36—will depend upon the effective length of the ground-engaging rod 37. Thus by making this rod shorter or longer the exact location at which the discharging of the scoop load takes place can be altered at will and the scoop made to discharge at different locations. This makes it possible to have the load in the truck distributed more evenly without necessitating the shoveling or leveling off of the load in the truck, which causes extra work and delay and which difficulty is commonly encountered with many of the truck-loading devices more commonly employed heretofore. The same effect can of course be obtained by altering the length of the cable 35 connecting the lever arm 36 with the latch 31.

It is also possible with my simple scoop-discharging attachment for the operator to control the discharging of the scoop manually by holding the rod 37 swung out of engagement with the ground and then pulling down manually on the rod or forward end of the lever arm 36 when the scoop has reached the position above the truck load at which he wishes the discharging of the scoop to take place. Preferably a shield 45 is provided at the forward end of the truck bin to protect the roof of the cabin on the truck from the material being loaded into the truck.

When the material to be loaded onto the truck has become packed or cemented together or is otherwise difficult to tear loose from the ground, it will be found that my truck loading means is particularly efficient in exerting the properly applied pressure and leverage for loosing the material preparatory to scooping it up. Thus when the teeth or prongs 38 of the scoop are pushed against or under such hard packed material the initial pull on the cable 42 and scoop handle 24, causing the scoop to rock backward, will exert a strong leverage to cause the scoop teeth to pry up and loosen the material. This prying up and loosening of the material can be repeated over and over if desired before the actual loading starts and thus, by loosening and breaking the material to be loaded, save time later in the loading of such material onto the truck.

Various modifications could be made in the truck-loading means which I have described and shown in the drawings and in the individual members of the device without departing from the principle of my invention, and it is not my intention to limit my invention to the exact structure described. Thus various shapes of scoops might be employed, and changes made in the structure of the main frame and in the mounting of the same upon the truck. However, the device for carrying out my invention which I have described, I have found to be simple and practical, and accordingly I consider my preferred means to be substantially as described.

I claim:

1. A truck loading device of the character described comprising a frame, said frame having bottom members and upright members, said frame pivotally mounted on the truck for swinging in a vertical plane, a scoop hinged on the rear of said bottom members, a pivotally mounted scoop handle, means limiting the movement of said handle and said scoop with respect to each other, a drum mounted on the truck, a cable on said drum, one end of said cable connected to said scoop handle, said cable passing over said upright frame members, said cable arranged to tilt said scoop handle, and therewith said scoop, towards the truck, and then to elevate the scoop end of said frame as said cable is wound on said drum, a latch limiting the normal tilting of said scoop, adjustable means for releasing said latch when said scoop and frame have been raised to predetermined positions above the truck, said latter mentioned means including a lever arm pivoted on said frame, one end of said lever connected with said latch, an adjustable ground engaging element connected to said lever and adapted to operate said lever and thereupon release said latch when said frame has been tilted to a predetermined position, an auxiliary frame hinged to the bottom of said first mentioned frame, one end of said auxiliary frame adapted to contact the ground when said first mentioned frame is in lowered position, and a link connecting said scoop with said auxiliary frame and arranged to tilt said scoop in the opposite direction from the truck when said auxiliary frame is brought into contact with the ground by the lowering of said first mentioned frame and scoop.

2. A truck loading device of the character described comprising a frame pivotally and detachably mounted on the truck for swinging in a vertical plane, a scoop hinged on the rear of said frame, a pivotally mounted scoop handle, means limiting the movement of said handle and said scoop with respect to each other, a drum mounted on the truck, a cable on said drum, one end of said cable connected to said scoop handle, said cable arranged to tilt said scoop handle, and therewith said scoop, towards the truck, and then to elevate the scoop end of said frame as said cable is wound on said drum, a latch limiting the normal tilting of said scoop, means for releasing said latch when said scoop and frame have been raised to predetermined positions above the truck, said latter mentioned means including a lever arm pivoted on said frame, one end of said lever connected with said latch, a ground engaging element connected to said lever and adapted to operate said lever and thereupon release said latch when said frame has been tilted to a predetermined position, an auxiliary frame associated with said first mentioned frame, one end of said auxiliary frame adapted to contact the ground when said first mentioned frame is in lowered position, and means connecting said scoop with said auxiliary frame and arranged to tilt said scoop in the opposite direction from the truck when said auxiliary frame is brought into contact with the ground by the lowering of said first mentioned frame and scoop.

3. A device of the character described for loading a truck including a frame pivotally mounted on the truck for swinging in a vertical plane, a scoop hinged on said frame, a pivotally mounted scoop handle, means limiting the movement of said handle and said scoop with respect to each other, a drum mounted on the truck, a cable on said drum, one end of said cable connected to said scoop handle, said cable arranged to tilt said scoop handle, and therewith said scoop, towards the truck, and then to elevate the scoop end of said frame as said cable is wound on said drum, a latch limiting the normal tilting of said scoop, means for releasing said latch when said scoop and frame have been raised to predetermined positions above the truck, said latter mentioned means including a lever arm pivoted on said frame, one end of said lever connected with said latch, a ground engaging element connected to said lever and adapted to operate said lever and thereupon release said latch when said frame has been tilted to a predetermined position, and means for automatically causing said scoop to be tilted in the opposite direction from the truck when said frame and scoop are lowered into loading position.

4. A device for loading a truck including a frame pivotally mounted on the truck for swinging in a vertical plane, a scoop hinged on said frame, a pivotally mounted scoop handle, means limiting the movement of said handle and said scoop with respect to each other, a drum mounted on the truck, a cable on said drum, one end of said cable connected to said scoop handle, said cable arranged to tilt said scoop handle, and therewith said scoop, towards the truck, and then to elevate the scoop end of said frame as said cable is wound on said drum, a latch limiting the normal tilting of said scoop towards the truck, adjustable means for releasing said latch when said scoop and frame have been raised to predetermined positions above the truck, and means for automatically causing said scoop to be tilted downwardly in the opposite direction away from the truck when said frame and scoop are lowered into loading position.

5. In a truck loading device of the character described, a frame pivotally mounted on the truck for swinging in a vertical plane, a scoop hinged on the rear of said frame, a pivotally mounted scoop handle, means limiting the movement of said handle and said scoop with respect to each other, a drum mounted on the truck, a cable on said drum, one end of said cable connected to said scoop handle, said cable arranged to tilt said scoop handle, and therewith said scoop, towards the truck, and then to elevate the scoop end of said frame as said cable is wound on said drum, a latch limiting the normal tilting of said scoop, and means for releasing said latch when said scoop and frame have been raised to predetermined positions above the truck, said latter mentioned means including a lever arm pivoted on said frame, one end of said lever connected with said latch, a ground engaging element connected to said lever and adapted to operate said lever and thereupon release said latch when said frame has been tilted to a predetermined position.

6. In a device of the character described for loading a truck, a frame pivotally mounted on the truck for swinging in a vertical plane, a scoop hinged on said frame, a scoop handle pivotally mounted on the side walls of said scoop, means on the side walls of said scoop limiting the movement of said handle and said scoop with respect to each other, a drum mounted on the truck, a cable on said drum, one end of said cable connected to said scoop handle, said cable arranged to tilt said scoop handle, and therewith said scoop, towards the truck, and then to elevate the scoop end of said frame as said cable is wound on said drum, a latch limiting said tilting of said scoop towards the truck by said handle and cable, and adjustable automatic means for releasing said latch when said scoop and frame have been raised to predetermined positions above the truck.

7. In a truck loading device, a frame pivotally mounted on the truck for swinging in a vertical plane, a scoop hinged on said frame, a scoop handle, a drum mounted on the truck, a cable on said drum, one end of said cable connected to said scoop handle, said cable arranged to tilt said scoop handle, and therewith said scoop, towards the truck, and then to elevate the scoop end of said frame as said cable is wound on said drum, an auxiliary frame hinged to the bottom of said first mentioned frame, one end of said auxiliary frame adapted to contact the ground when said first mentioned frame is in lowered position, and a link connecting said scoop with said auxiliary frame and arranged to tilt said scoop downwardly in the opposite direction away from the truck when said auxiliary frame is brought into contact with the ground by the lowering of said first mentioned frame and scoop.

8. In a truck loading device, a frame pivotally mounted on the truck for swinging in a vertical plane, a scoop hinged on said frame, a scoop handle, a drum mounted on the truck, a cable on said drum, one end of said cable connected to said scoop handle, said cable arranged to tilt said scoop handle, and therewith said scoop, towards the truck, and then to elevate the scoop end of said frame as said cable is wound on said drum, an auxiliary frame associated with said first mentioned frame, said auxiliary frame having ground engaging members adapted to contact the ground when the scoop end of said first mentioned frame is returning to lowered position, and means connecting said scoop with said auxiliary frame and arranged to tilt said scoop downwardly in the opposite direction away from the truck when said auxiliary frame is brought into contact with the ground by the lowering of said first mentioned frame and scoop.

STANLEY SMITH.

REFERENCES CITED

The following references are of record in the file of this patent:

UNITED STATES PATENTS

| Number | Name | Date |
|---|---|---|
| 856,018 | Belden | June 4, 1907 |
| 890,061 | Jarboe | June 9, 1908 |
| 947,964 | Collins et al. | Feb. 1, 1910 |
| 2,067,879 | Whitmire | Jan. 12, 1937 |
| 2,116,351 | Jones et al. | May 3, 1938 |
| 2,190,164 | Seyller | Feb. 13, 1940 |
| 2,254,464 | Wheeler | Sept. 2, 1941 |
| 2,310,284 | Gurries | Feb. 9, 1942 |
| 2,327,473 | Wagner et al. | Aug. 24, 1943 |
| 2,347,456 | Beckwith | Apr. 25, 1944 |
| 2,352,068 | Beckwith | June 20, 1944 |
| 2,387,687 | Smith | Oct. 23, 1945 |